July 12, 1960  G. R. QUICK  2,944,348
SIMULATED TURN AND BANK INDICATOR
Filed July 23, 1958  2 Sheets-Sheet 1

INVENTOR.
GEORGE R. QUICK
BY
ATTORNEY

July 12, 1960
G. R. QUICK
2,944,348
SIMULATED TURN AND BANK INDICATOR
Filed July 23, 1958
2 Sheets-Sheet 2
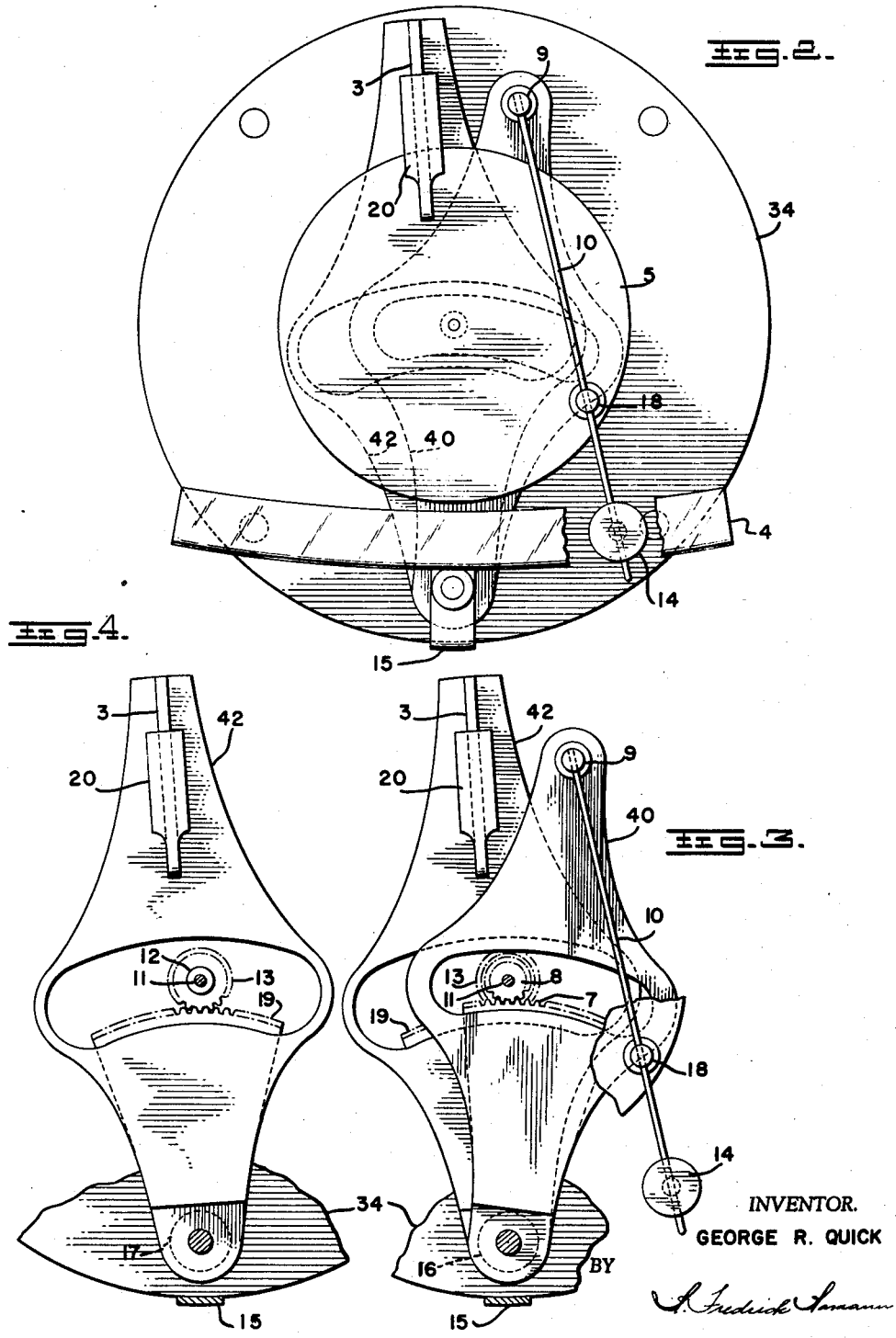
INVENTOR.
GEORGE R. QUICK
BY
ATTORNEY

United States Patent Office 2,944,348
Patented July 12, 1960

2,944,348

SIMULATED TURN AND BANK INDICATOR

George R. Quick, Silver Spring, Md., assignor to ACF Industries, Incorporated, New York, N.Y., a corporation of New Jersey Filed July 23, 1958, Ser. No. 750,338

8 Claims. (Cl. 35—12)

This invention relates to nonflying aircraft trainers and more particularly to an improved turn and bank indicator for use in such trainers.

As is well known, pilots flying aircraft having a turn and bank type indicator endeavor to retain the ball in its central position throughout the flight and particularly while executing a turn movement. A properly executed turn is referred to as a coordinated turn. A coordinated turn movement is one in which, by conjoint use of rudder and aileron controls, the degree of bank and rate of turning are so coordinated that the resultant of the force of gravity tending to move a body towards the down-wing side of the aircraft during the bank is exactly offset by the resultant of the centrifugal force tending to move the body towards the up-wing side of the aircraft. Thus, when a turn is properly coordinated the ball indicator remains in a central, neutral or stable position but whenever the controls are not properly coordinated the ball moves away from the center position indicating to the pilot that he should manipulate his controls until the ball again returns to its central, stable position.

In nonflying aircraft trainers, where the natural ball-displacing forces of an actual aircraft in flight are necessarily absent, the above described effects have been reproduced in a variety of fashions, one of which utilizes a rocking tube to position the ball therein through the action of gravity alone, the tube being rocked in proportion to simulated ball-displacing forces resulting from trainee actuation of flight controls. This instrument is not satisfactory because, when the trainee has become familiar with the rocking tube and ball of the trainer, an entirely foreign situation confronts him when he encounters the actual instruments in an aircraft.

Another method employs a sphere or disc attached to a rod rotatably suspended from a pivot coinciding with the center point of the curve of an arcuate open slot in the dial face, the slot being the same size as an actual arcuate tube. Since the radius of curvature of such a tube substantially exceeds the dimensions of the dial face in which it is usually set, ball bank simulators of the last named type require that the ball-simulating body be suspended from a point on the rear of the instrument panel substantially above the dial face in order that the body will always be in registry with the slot throughout its entire range of movement. This arrangement is unsatisfactory in that the operating mechanism for the ball simulating body is separately mounted from the dial face so that repairs or adjustments to the bank indicator simulator must be done in the trainer itself resulting in frequent and extended periods of inactivity which could otherwise be utilized for pilot training. Furthermore, as far as is known, in ball-bank simulators of this type, no attempt has been made to reproduce the appearance of the liquid filled tube which would confront the pilot in an actual aircraft.

Many different mechanical and electromechanical devices have been used in attempting to accurately simulate the positioning and movement of the ball in turn and bank indicators. Binding gear trains, backlash, low resolution drive, and poor pivot operation lead to sticking and erratic motion of the ball and therefore unrealistic turn and bank simulation. This invention avoids the shortcomings of prior indicators and provides an accurate inexpensive simulation utilizing a minimum number of parts.

It is therefore a broad object of this invention to provide an improved indicating instrument.

It is a further object of this invention to provide an improved turn and bank instrument.

It is another object of this invention to provide an improved bank indicator for simulated aircraft.

It is a still further object of this invention to provide an improved turn and bank instrument in which the bank indicating member position results from the combined drive of a plurality of motions.

It is a more specific object of this invention to provide an improved turn and bank indicator for flight simulators in which the combined motion of a sliding pivot and a sector gear pivot are utilized to provide a positive drive to a ball indicator to subscribe an arc whose center lies beyond the physical limits of the indicator itself.

The novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

Fig. 2 is a front elevation of the turn and bank indicator with a partial cutaway.

Fig. 3 is a front elevation of the turn and bank rocker arms taken along line 3—3 of Fig. 1.

Fig. 4 is a front elevation of the turn rocker arm taken along line 4—4 of Fig. 1.

Figure 1:
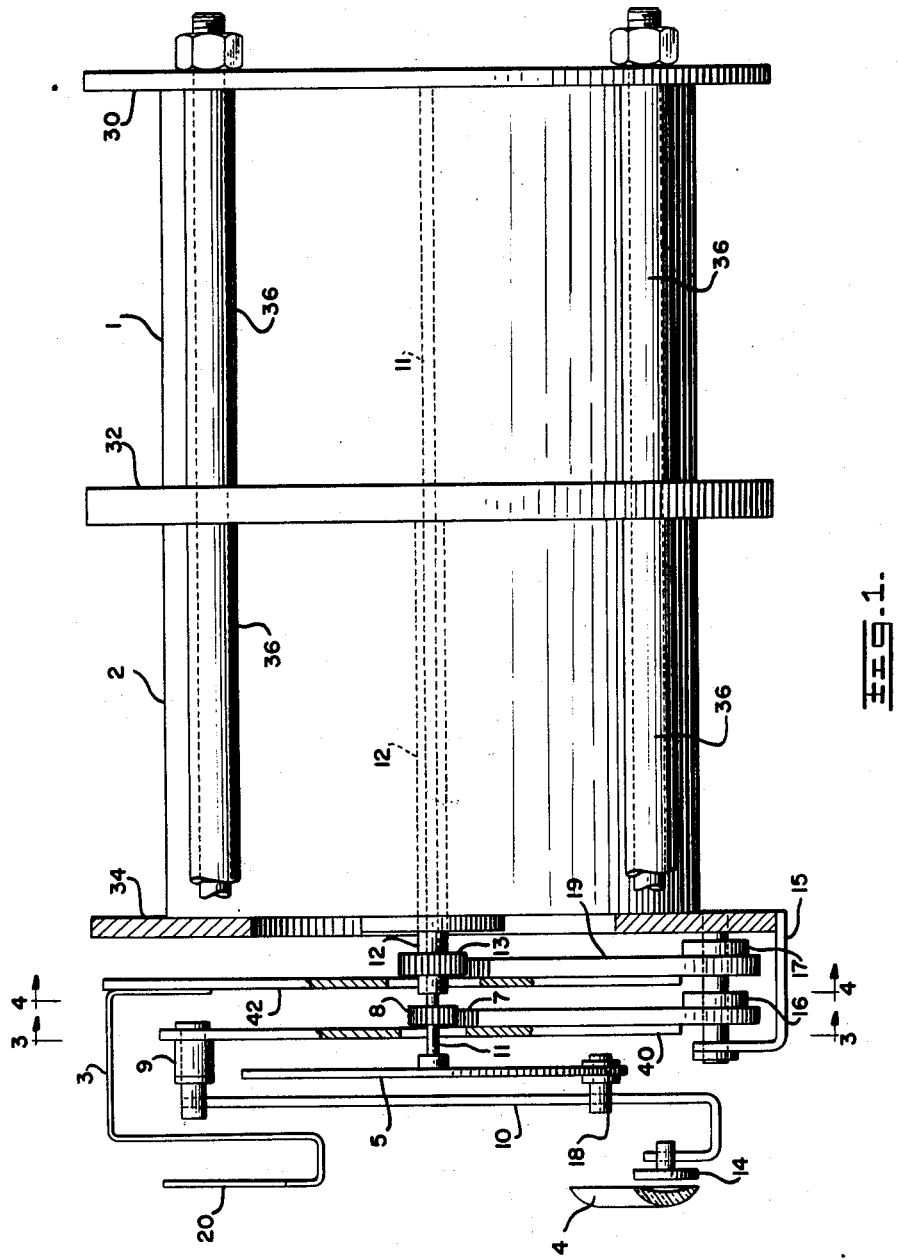
Fig. 1 is a side elevation of the turn and bank indicator.

The preferred embodiment of this invention provides apparatus including a sliding pivot and sector gear pivot, movable in response to computed ball angle, to accurately position a ball indicator along an arc whose center lies beyond the extremities of the apparatus itself.

In the following detailed description of the apparatus by which the objects of the invention are realized, it should be remembered that the actual ball angle quantity is computed by apparatus not shown. These computers may have as their output mechanical, electrical, hydraulic or pneumatic quantities which may be translated into suitable information for activating the turn and bank indicator. In its preferred embodiment this invention utilizes electrical information originating in computer equipment and translates it into visual indications of simulated bank angle and turning rate.

The operation of the invention is as follows.

A pair of autosyns 1 and 2 with concentric shafts 11 and 12 are driven from electrical information received from computing equipment. The autosyns are mounted in a framework arrangement comprising plates 30, 32 and 34 held rigidly by bolted spacers 36. The rotation of the shaft 11 of the rear autosyn 1 causes the pinion gear 8 to rotate approximately 90 degrees. Attached to this gear 8 and shaft 11 is a circular plate or rotatable member 5 which rotates with the gear 8 and shaft 11. As the gear 8 rotates, it causes a sector gear 7 to rotate approximately thirteen degrees. The arm 40 is attached to sector gear 7 and since the combination can easily be made as one item they will be referred to as sector gear rocker arm 7. The rotation above mentioned causes a movable pivot 9 at the extreme end of the geared rocker arm 7 to describe an arc about a fixed pivot 16 at the opposite end of the rocker arm. While the sector gear is describing an arc of approximately thirteen degrees the rotatable member 5 rotates through approximately ninety degrees. Movement in excess of ninety degrees would tend to move the arm 10 back toward the center of the instrument. The rotatable sliding pivot 18 is attached to the rotatable member 5 in a manner to allow the pivot 18 to rotate about an axis perpendicular to the plane of the rotatable member, and is in slidable engagement with arm 10. The motion of the pivot 18 is an arc limited to approximately ninety degrees whose center is on the axis of the autosyn shaft 11. The combined motion of the sliding pivot 18 and the movable sector gear pivot 9, to which one end of arm 10 is connected, causes the ball arm 10 to move in such a fashion that the end of the arm to which the disc 14 is attached, moves in an arc whose center is located outside the case of the indicator. As the ball 14 moves it travels adjacent the transparent window 4 which is provided to simulate the liquid filled tube of the actual instrument.

The front autosyn 2 drives a gear 13 which, when rotating, moves a sector gear 19 and plate 42. As a part of this sector gear is an arm 3 and a pointer 20 which serve to simulate the turning rate needle. A base 15 is shown to designate a reference plane for the pivots 16 and 17.

Variations of the ratio of the gear attached to the rear autosyn shaft and the sector gear mating with it will provide an infinite number of radii of curvature of the ball path. The only limitation occurs when the ratio is such that the ball pivots about an axis concentric with the autosyn shafts. This represents an arc having the smallest radius that the ball can travel. As the gear ratio is increased the ball travel can become a straight line.

It is thus seen that an improved instrument is provided whereby the combined motion of a sliding pivot and a movable sector gear pivot cause a ball arm to move in such a fashion that the end of the arm to which the ball is attached moves in an arc whose center is located outside the apparatus itself.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. Instrument apparatus comprising a base, a rocker arm pivoted at one end on said base, an indicator arm pivoted on and depending from the other end of the said rocker arm, a rotatable member journaled for rotational movement, means to rotate the said rotatable member and pivot said rocker arm, and other means on said rotatable member to pivot said indicator arm.

2. Instrument apparatus comprising a base, a rocker arm pivoted at one end on said base, an indicator arm having an indication member attached to one extremity, the other extremity being pivoted on and depending from the other end of the said rocker arm, a rotatable member journaled for rotational movement, means to rotate the said rotatable member and pivot said rocker arm, and other means on said rotatable member to pivot said indicator arm.

3. Instrument apparatus comprising a base, a rocker arm pivoted at one end on said base and movable through an arc of approximately 13 degrees, an indicator arm pivoted on and depending from the other end of the said rocker arm, a rotatable member journaled for rotational movement of not more than ninety degrees on each side of the center, means to rotate said rotatable member and pivot said rocker arm, and other means on said rotatable member to pivot said indicator arm.

4. Simulated flight instrument apparatus comprising a base, a rocker arm pivoted at one end on said base, an indicator arm pivoted on and depending from the other end of the said rocker arm, a rotatable member, means responsive to computed simulated flight values to rotate said rotatable member and pivot said rocker arm, and other means on said rotatable member to pivot said indicator arm.

5. In a grounded flight trainer having means for computing the rate of turn and bank angle to be indicated to a student pilot, simulated flight instrument apparatus for indicating the rate of turn and ball angle in which the ball angle apparatus comprises a base, a rocker arm pivoted at one end on said base, an indicator arm pivoted on and depending from the other end of the said rocker arm, a rotatable member, means responsive to the computed ball angle value to rotate said rotatable member no more than ninety degrees each side of its center position and pivot said rocker arm through an arc of approximately thirteen degrees, and other means on said rotatable member to pivot said indicator arm.

6. Simulated indicia apparatus comprising a shaft having a pinion gear whose rotation is analogous to a variable value, gear means movable in response to drive from the said pinion gear and having fixed, movable and rotatable pivot means associated therewith, arm indicia slidably mounted in the said rotatable pivot means and having one extremity attached at the movable pivot means whereby rotation of the said shaft causes displacement of the arm indicia by the combined motion of the movable and rotatable pivot means.

7. Simulated indicia apparatus comprising a shaft having a pinion gear whose rotation is limited to ninety degrees either side of center and whose rotation is analogous to the value of a simulated flight ball angle, gear means movable in response to drive from the said pinion gear and having fixed, movable and rotatable pivot means associated therewith, arm indicia slidably mounted in the said rotatable pivot means and having one extremity attached at the movable pivot means whereby rotation of the said shaft causes displacement of the arm indicia by the combined motion of the movable and rotatable pivot means.

8. In a simulated flight instrument apparatus representative of a bank indicator comprising a frame to support said apparatus, an electrical rotational member whose angular position is analogous to that which an actual bank indicator would display during a real flight, a pinion gear having a disc associated therewith so as to produce proportional angular displacement of the disc for displacement of the pinion gear, a drive member interconnecting the electrical rotational member with the pinion gear whereby rotation of the rotational member imparts a proportional rotation to the pinion gear, a sector gear member having teeth in meshing relation with the pinion gear so as to be driven thereby and having one point pivotable at a point on the apparatus frame and having a second point to which a pivotable arm is attached, a sliding rotatable pivot having an aperture therein and being attached to said disc the said pivotable arm passing through the said rotatable aperture and movable thereby so that rotation of the drive member rotates the pinion gear to move the pivot junction of the sector gear and pivotable arm in an arc about the frame pivot and the combined motion of the pivot junction and rotatable pivot moves the pivotable arm so that the extremity thereof subscribes an arc the center of which if determined would lie outside the apparatus and a disc like member attached to the extremity of the pivotable arm so as to simulate in appearance the bank indicator of an actual aircraft instrument.

References Cited in the file of this patent

UNITED STATES PATENTS

| | | |
|---|---|---|
| 2,686,979 | Benson | Aug. 24, 1954 |
| 2,809,446 | Dement | Oct. 15, 1957 |